US008165235B2

(12) United States Patent
Teng et al.

(10) Patent No.: US 8,165,235 B2
(45) Date of Patent: Apr. 24, 2012

(54) INTERFERING STREAM IDENTIFICATION IN WIRELESS COMMUNICATION SYSTEMS

(75) Inventors: Yong Teng, Beijing (CN); Jiang Yu, Beijing (CN)

(73) Assignee: Nokia Corporation, Espoo (FI)

( * ) Notice: Subject to any disclaimer, the term of this patent is extended or adjusted under 35 U.S.C. 154(b) by 871 days.

(21) Appl. No.: 12/286,884

(22) Filed: Oct. 2, 2008

(65) Prior Publication Data

US 2009/0086837 A1 Apr. 2, 2009

Related U.S. Application Data

(60) Provisional application No. 60/997,244, filed on Oct. 2, 2007.

(51) Int. Cl.
*H04K 1/10* (2006.01)
*H04L 27/28* (2006.01)

(52) U.S. Cl. ........ 375/260; 375/346; 375/267; 375/340; 375/347; 375/349; 455/62; 455/101; 455/500; 455/63.1; 455/296

(58) Field of Classification Search ............ 375/260, 375/259, 267, 340, 347, 349, 346; 455/62, 455/101, 500, 63.1, 296
See application file for complete search history.

(56) References Cited

U.S. PATENT DOCUMENTS

| 5,048,015 | A | 9/1991 | Zilberfarb ............ 370/110.4 |
| 6,332,076 | B1 | 12/2001 | Shah et al. ............ 455/423 |
| 7,010,069 | B2 | 3/2006 | Chugg et al. ............ 375/346 |
| 7,424,268 | B2 * | 9/2008 | Diener et al. ............ 455/62 |

FOREIGN PATENT DOCUMENTS

WO    WO 03/063532    7/2003

OTHER PUBLICATIONS

J. Ylitalo, E. Tiirola, "Performance Evaluation of Different Antenna Array Approaches for 3G CDMA Uplink", Proceedings of 51st Annual International Vehicular Technology Conference (VTC'00), Tokyo, 2000, pp. 883-887.
J.H. Winters, "Optimum Combining for Indoor Radio Systems with Multiple Users", IEEE Transactions on Communications, 1987, vol. 35, pp. 1222-1230.
E. Fishler and H. V. Poor, "Estimation of the number of sources in unbalanced arrays via information theoretic criteria," IEEE Trans. of Signal Process., vol. 53, No. 9, pp. 3543-3553, Sep. 2005.
Quinlan A, et al., "Model Order Selection for Short Data: An Exponential Fitting Test (EFT)", Eurasip Journal on Advances in Signal Processing, vol. 2007, Jan. 2007, pp. 1-11, XP002528336.
Quinlan A et al, "Model Order Selecting for Short Data: An Exponential Fitting Test (EFT)" Eurasip Journal on Advances in Signal Processing, vol. 2007, Jan. 2007, pp. 1-11, XP002528336, First paragraph of the introduction p. 2, sections 2.1 and 2.2.

* cited by examiner

*Primary Examiner* — Phuong Phu
(74) *Attorney, Agent, or Firm* — Harrington & Smith

(57) ABSTRACT

An exemplary embodiment in accordance with this invention is a method for determining the number of interfering streams. The method includes calculating statistical information based on one or more received OFDM signals. The number of interfering streams is estimated from the statistical information in this method. The OFDM signal(s) are received via a plurality of antennas. Storing the OFDM signal(s) in a square matrix may be included in the method. A covariance matrix of the square matrix can be determined; and a noise subspace and a signal plus interference subspace can be determined based on a SVD of the covariance matrix. The statistical information may be based on the signal plus interference subspace. Apparatus, computer programs and computer-readable media are also disclosed.

17 Claims, 6 Drawing Sheets

INTERFERING STREAM IDENTIFICATION IN WIRELESS COMMUNICATION SYSTEMS

CROSS-REFERENCE TO RELATED APPLICATIONS

This patent application claims priority to Provisional U.S. Application Ser. No. 60/997,244, filed Oct. 2, 2007, the disclosure of which is incorporated by reference in its entirety.

TECHNICAL FIELD

The exemplary embodiments of this invention relate generally to wireless communication systems and, more specifically, relate to identifying interfering streams.

BACKGROUND

This section is intended to provide a background or context to this invention. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations are utilized herein:
AIC Akaike Information Criterion
BER bit error rate
BS base station
CDF cumulative density function
FFT fast Fourier transform
i.i.d. independent identically distributed
IRC interference rejection combining
ITU International Telecommunications Union
MDL minimum description length
MIMO multi-input multiple-output
MRC maximum ratio combining
NBI narrowband interference
QPSK quadrature phase shift keying
OFDM orthogonal frequency division multiplexing
PDF probability density function
QOS quality of service
SIR signal to interference ratio
SINR signal to interference plus noise ratio
SNR signal to noise ratio
SVD singular value decomposition
UWB ultra wide band Multiple-input multiple-output (MIMO) has the potential for achieving a high data rate and providing more reliable reception performance. Orthogonal frequency division multiplexing (OFDM) can be used to make wideband frequency-selective channels to be a number of parallel narrowband sub-channels by splitting one data stream into several parallel streams. As a result, the combination of MIMO and OFDM can be used to provide many options in space, time and frequency domains. MIMO-OFDM systems are promising candidates for several wireless systems, such as 3GPP LTE, 802.16, 4G wireless systems, ultra wide band (UWB) and cognitive radio systems.

The spectral efficiency of wireless communication system can be further improved by reusing frequencies in adjacent cells of the cellular system or in different wireless systems (e.g., cognitive radio) as needed. However, such reuse risks strong co-channel interference, which can dramatically degrade the performance of the system. Strong co-channel interference impact will become more and more important. Fortunately, with the development of antenna array/MIMO technology, using multiple antennas at the receiver to suppress strong co-channel interference is possible.

An MIMO-OFDM cellular system is shown in FIG. 1. The central cell 110, at a certain frequency and time, has one user 115 and three co-channel interference sources 125a, 125b and 125c from adjacent cells 120. When the user 115 and the co-channel interference sources 125 are at the edges of their cells, the signal to interference ratio (SIR) may be very low. To improve the system performance, the receivers can implement interference suppression schemes. The receivers can use interference rejection combining (IRC), which is used in 2G, 3G and possibly also in 3GPP LTE, to suppress the interference. See J. Ylitalo, E. Tiirola, "Performance Evaluation of Different Antenna Array Approaches for 3G CDMA Uplink", Proceedings of 51st Annual International Vehicular Technology Conference (VTC'00), Tokyo, 2000, pp. 883-887.

It has been shown that M antennas can tolerate M−1 single interference streams. Therefore, using fewer antennas than interfering streams can degrade the system performance. See J. H. Winters, "Optimum Combining for Indoor Radio Systems with Multiple Users", IEEE Transactions on Communications, 1987, Vol. 35, pp. 1222-1230.

In FIG. 2, a comparison of two interference conditions using an interference rejection combining (IRC) receiver is shown. In the first situation, there is one user and one interference source. Here, the user's signal power equals the interference power, i.e., $SIR_{total}=SIR_1=0$ dB. In the second situation, there are two interference sources. The user's signal power equals the total interference power and the power of the two interferences is the same, i.e., $SIR_{total}=0$ dB; $SIR_1=SIR_2$. The channel is a Rayleigh one tap channel with a mobile speed of 90 km/h. The user and the interference sources each have one transmit antenna and the base station (BS) has two receive antennas.

Using a signal to Gaussian noise ratio: SNR=signal power/$\sigma^2$, several conclusions can be drawn. When the SIR and noise power are low the bit error rate (BER) performance depends primarily on the interference. When the signal to total interference ratio is fixed, the two-antenna, IRC receiver is less effective for two interfering streams. If there is no interference, using IRC instead of MRC will not obtain a performance gain and will be more complex. Therefore, determining the number of interference sources can improve system performance.

IRC works well when there is only one strong interference signal. Using two antennas, the strong interference can effectively be suppressed when compared to maximum ratio combination (MRC). However, this does not cover all interference situations. There might be more than one strong interference source, which make IRC with two antennas inefficient.

Strong co-channel interference is often present in current wireless systems and greatly degrades the performance of the system. Thus, it is very useful to have the knowledge of any strong interfering streams. Some mechanisms could be employed at the transmitter or receiver according to the current interference conditions, which can make the wireless systems more robust and efficient.

An OFDM based ultra wide band (UWB) system could also benefit from identification of interfering streams. UWB utilizes an extremely wide frequency band with very low power to transmit signals. However, narrowband interference (NBI) will degrade the performance of UWB systems. Determining the presence of and location of interfering streams is significant to UWB systems. Thus, a flexible interfering stream identification scheme is needed.

In an OFDM based cognitive radio system, a licensed user and a secondary user from different wireless systems may co-exist in the same frequency band. If the licensed user doesn't use the channel at a given time, the secondary user from the other wireless system might use it to improve the frequency spectrum efficiency. However, since the licensed user has the priority of the channel, the secondary user should return the channel to the licensed user immediately when it is needed by the licensed user. As a result, identifying the licensed user's signal (which appears as interference to the secondary user) is needed in order to surrender the frequency band to the licensed user.

Based on the above description, it is very significant to come up with techniques to identify the interference. In Zilberfarb, "Interference source identification", U.S. Pat. No. 5,048,015, a solution is presented that uses an identification code of the transmitters creating the interference. In Shah et al., "Method and system for identifying and analyzing downlink interference source in a telecommunication network", U.S. Pat. No. 6,332,076 B1, a solution is presented that uses a database with time information of received interference signals. In Larsson et al., "Method for interference source identification", WO 03/063532 and Chugg et al., "Method for co-channel interference identification and mitigation", U.S. Pat. No. 7,010,069 B2, solutions are presented which require the use of 'training sequences' in the interference signals.

The above solutions use additional resources, such as an interference's training sequence, identification code, carrier information, etc. In some cases it may be impossible to get these resources. These prior solutions may also be very complex, e.g. the receivers may be required to test the training sequences of all the adjacent cells (6 adjacent cells in FIG. 1) to determine the number of interference sources even if there is only one source of interference.

As seen in E. Fishler and H. V. Poor, "Estimation of the number of sources in unbalanced arrays via information theoretic criteria," IEEE Trans. of Signal Process., vol. 53, no. 9, pp. 3543-3553, September 2005, estimating the number of signal sources (which is considered in many fields such as bio-medical, microphone system, direction of arrival estimation and so on) through a sensor array has been a well investigated problem, which treats all the independent signals as desired signals instead of as interference. A common approach to solve this problem is to use an information theoretic criterion, such as minimum description length (MDL) or the Akaike Information Criterion (AIC). Such methods use many snapshots and computation and may be too complex to be implemented in practical mobile systems.

SUMMARY

The following summary provides exemplary and non-limiting example in accordance with this invention.

An exemplary embodiment in accordance with this invention is a method for determining the number of interfering streams. The method includes calculating statistical information based on one or more received OFDM signals. The number of interfering streams is estimated from the statistical information in this method. The one or more OFDM signals are received via a plurality of antennas (e.g., two or more individual antennas, an antenna array).

An additional exemplary embodiment in accordance with this invention is an apparatus for determining the number of interfering streams. The apparatus includes a processor. The processor is configured to calculate statistical information based on one or more received OFDM signals; and to estimate a number of interfering streams from the statistical information. The one or more OFDM signals are received via a plurality of antennas.

A further exemplary embodiment in accordance with this invention is a computer program for determining the number of interfering streams. A computer-readable medium may be tangibly encoded with the computer program. The computer program includes program instructions, execution of the program instructions results in operations including calculating statistical information based on one or more received OFDM signals; and estimating a number of interfering streams from the statistical information. The one or more OFDM signals are received via a plurality of antennas.

An additional exemplary embodiment in accordance with this invention is a computer program for determining the number of interfering streams. A computer-readable medium may be tangibly encoded with the computer program. The computer program includes program instructions, execution of the program instructions results in operations including calculating statistical information based on one or more received OFDM signals; and estimating a number of interfering streams from the statistical information. The one or more OFDM signals are received via a plurality of antennas.

A further exemplary embodiment in accordance with this invention is a signal encoded with/embodying a computer program for determining the number of interfering streams. The computer program includes program instructions, execution of the program instructions results in operations including calculating statistical information based on one or more received OFDM signals; and estimating a number of interfering streams from the statistical information. The one or more OFDM signals are received via a plurality of antennas.

An additional exemplary embodiment in accordance with this invention is an apparatus for determining the number of interfering streams. The apparatus includes means for calculating statistical information based on one or more received OFDM signals. Means for estimating a number of interfering streams from the statistical information are also included. The one or more OFDM signals are received via a plurality of antennas.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
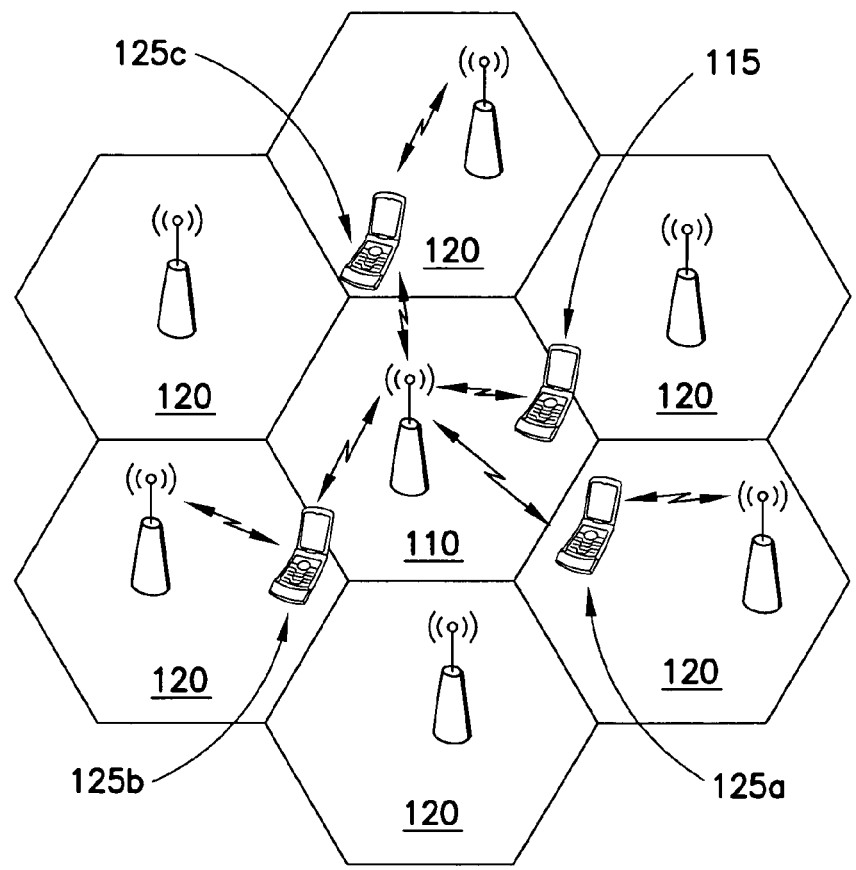
FIG. 1 shows an illustration of a MIMO-OFDM cellular system.
Figure 2:
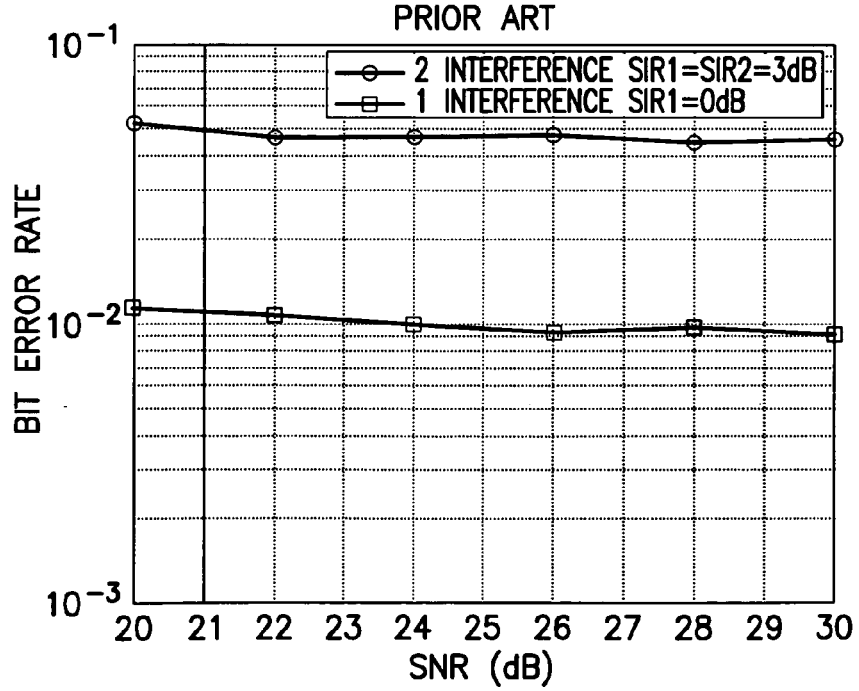
FIG. 2 depicts a BER vs. SNR for an IRC receiver.

Exemplary embodiments of this invention can be used in many systems based on OFDM. Such embodiments can utilize received OFDM signals from an antenna array and subspace concepts to estimate the number of interfering streams (or the lack thereof). An interference source may produce one or more interfering streams.

Exemplary embodiments of this invention can be implemented in a MIMO OFDM system with little complexity. There is no need for training sequences or other overhead. Such embodiments use received OFDM signals, regardless of what is being transmitted, e.g., data, pilot, etc.

In a cellular system, the IRC receiver may adjust its active antenna number based on an instantaneous interfering stream number, or use other receive methods when interference is absent, e.g., MRC, zero forcing etc. Other interference mitigation techniques may also benefit from determining the number of interfering streams.

In an OFDM based cognitive radio system, when a licensed user suddenly claims its own channel, the secondary user may utilize an exemplary embodiment of this invention to detect the channel occupancy condition without any additional control information from the licensed user.

In an OFDM based Ultra Wide Band (UWB) system, an exemplary embodiment of this invention provide an easy way to identify the NBI.

The received OFDM signals from multiple receive antennas and subspace methods are used to identify the number of interferences. When the receiver is installed with M antennas, the received signals from M adjacent sub-carriers at M receive antennas are stored to form a square matrix. The covariance matrix of the square matrix can be obtained. Thus, the condition numbers of this covariance matrix can be calculated. Based on statistical information of the wireless channel's condition numbers, which can be acquired in advance, the interference number can be estimated. There is no need to add additional pilot or other overhead, and the receiver need not know the interference's training sequence. Only the received OFDM signal is used, regardless of which kind of information is transmitted.

According to the obtained interference information, different possible mechanisms may be employed, e.g., whether any effective interference mitigation schemes should be used. The receiver can also adjust its actions based on the interfering stream numbers. For example, the receiver can use other receive algorithms instead of an interference suppression algorithm when no interference is present. If there are more interfering streams, the receiver may consider all the important factors comprehensively, such as quality of service (QoS), complexity, time delay, power, etc., to adjust its active receive antenna number.

While in an OFDM based cognitive radio system, a secondary user will give the right of use of the channel to the licensed user automatically when it identifies the interference from licensed user.

In an OFDM based UWB system, the users may abandon some sub-carriers, which are polluted by NBI.

An exemplary embodiment of this invention is a MIMO-OFDM cellular system. For a certain time and frequency band, there is one desired signal and some co-channel interference signals. In this system, all transmitters have $N_t$ antennas, and the receiver has M antennas. Although all transmitters have the same number of antennas for the sake of the illustration, this is a non-limiting example. Different numbers of transmit antennas from desired sources and interference sources are also possible. For the OFDM system, after a fast Fourier transform (FFT) processing of signal and channel at the BS, the system model can be described using channel and signal in frequency domains. As a result, for the $i^{th}$ sub-carrier, the received M×1 signal vector is defined as:

$$y_i = H_{i,0}x_{i,0} + \sum_{j=1}^{K} H_{i,j}x_{i,j} + n_i$$

where, i is the sub-carrier number, M×$N_t$ matrices $H_{i,0}$ and $H_{i,j}$ are the frequency channel responses of the desired signal and the interference signals respectively. The index of interference is j and there are K strong co-channel interference streams in total. Furthermore, $N_t$×1 matrices $x_{i,0}$ and $x_{i,j}$ represent the transmit signals of the desired signal and interference in sub-carrier i. The power of these transmitted signals is defined as $E(x_{i,j}x_{i,j}^H)=P_j I_{N_t}$, where $I_{N_t}$ is an $N_t$×$N_t$ identity matrix. An i.i.d complex Gaussian noise vector in the frequency domain is denoted by $n_i$, whose elements have a zero mean and a variance of $\sigma_n^2$, e.g., $E(n_i n_i^H)=\sigma_n^2 I_M$.

Once the receiver receives an OFDM symbol (e.g., a pilot symbol), received signals from M adjacent sub-carriers at M receive antennas can be denoted as the matrix Y=[$y_i$ $y_{i+1}$ ... $y_{i+M-1}$], where $y_j$ represents the received signals from j-th subcarriers at all M receive antennas.

The number of receiver antennas, M, is assumed to be greater than the sum of the desired transmitter's and interference sources' transmit antennas, i.e., M>(K+1)$N_t$. Although there may be more interference streams in some cellular systems, the number of strong interference streams may be minimal due to possible interference mitigation schemes already employed. Due to the correlation between adjacent sub-carriers, the M frequency channel coefficients in adjacent sub-carriers are very similar. Therefore, the covariance matrix of Y can be calculated as $R_{YY}=E(YY^H)$. Performing singular value decomposition (SVD) for $R_{YY}$ results in:

$$R_{YY} = U \begin{bmatrix} \Sigma_S & & \\ & \Sigma_I & \\ & & \Sigma_N \end{bmatrix} V^H$$

where, diagonal matrices $\Sigma_S$, $\Sigma_I$ and $\Sigma_N$ denote the signal subspace, interference subspace and noise subspace, respectively. If the signal to noise ratio (SNR) and interference to noise ratio (INR) are large, then the noise subspaces $\Sigma_N$ can be separated easily from signal plus interference subspace $\Sigma_S+\Sigma_I$. Consequently, based on the statistical information from this matrix, e.g. the distribution of its singular value and the number of antennas from desired transmitter, the number of interference sources or interference streams can be estimated.

A further exemplary embodiment of this invention is shown below. The system's parameters are M=8, $N_t$=2, K=2, SNR=20 dB, $SIR_q$=0 dB, q∈1,2 and it is assumed that 8 adjacent sub-carriers have the same frequency channel response. $SIR_q$ is the signal to the $q^{th}$ interference ratio. Using QPSK and performing an SVD algorithm for an 8×8 matrix, $R_{YY}$, a diagonal matrix is obtained. The diagonal matrix is: $\Sigma$=diag ([290 211 68 39 7 2.2 0.0067 0.0004]).

It is possible to differentiate the noise subspace from the signal and interference subspaces by finding the drastically changed singular value. That is, because $\lambda_6$ is more than 300 times greater than $\lambda_7$, where $\lambda_l$, l∈[1,M] denotes the $l^{th}$ singular value, the noise sub-space has two singular values. As the noise subspace has been determined, it is possible to determine the number of interference sources or interfering streams.

A condition number is defined in order to find a drastically changed singular value, and thus, to determine the noise subspace. The condition number of $R_{YY}$ is:

$$\gamma_d = \frac{\lambda_d}{\lambda_{d+1}}, d \in [1, M-1].$$

Thus, $\gamma_1 \approx 1$, $\gamma_2 \approx 3$, $\gamma_3 \approx 2$, $\gamma_4 \approx 5$, $\gamma_5 \approx 3$, $\gamma_6 \approx 328$ and $\gamma_7 \approx 17$. As a result, the signal and interference subspaces have six singular values. Moreover, since $N_t$ can be known by the receiver (e.g., as a pre-defined system parameter) and it has been determined that there are six singular values in the signal and interference subspaces, it is possible to estimate that the number of interference sources or interfering streams is two.

An exemplary embodiment of this invention for practical wireless channel models and practical systems can use the following algorithm.

Statistical parameters of a received signal are computed. Simulations based on various channel realizations of a practical scenario are performed. The simulations can cover many possible numbers of interfering streams and possible SINR regions over which the link is supposed to operate. These statistical parameters can also be obtained via measurements, which may be faster but more complicated. The statistical parameters of the received signals may be condition numbers of a received signal covariance matrix which is formed using the received signals at a plurality of subcarriers from a plurality of receive antennas.

Based on the distribution of the statistical parameters, one of a plurality of thresholds for the statistical parameters can be determined, which is used to estimate the number of interfering streams or interference sources. These thresholds or other alternatives for different scenarios may be stored in a database. The aforementioned database is preferably created offline, before the start of a transmission and possible adaptation procedures.

During operation, the receiver receives one of a plurality of OFDM symbols from a plurality of receive antennas. Then the statistical parameters of the received signals could be computed. The statistical parameters could include an (expected) condition number for the covariance matrix of a received signal matrix which is formed using received signals at a plurality of subcarriers from a plurality of receive antennas. Based on the thresholds in the database, the number of interfering streams or interference sources can be estimated.

As a further example, an exemplary embodiment of this invention is illustrated with a practical wireless propagation channel model ITU Pedestrian B. Each transmitter has only one transmit antenna and the receiver has four receive antennas. Therefore, M=4, $N_t$=1, SNR=20, $SIR_q$=0d and q∈[1,2].

Various channel realizations of the ITU Pedestrian B (40000 realizations) are used to obtain statistical information of the condition numbers, e.g., probability density function (PDF) and cumulative density function (CDF). Plots of the CDF and PDF vs. the condition numbers for K=0, K=1 and K=2 are shown in FIGS. 3, 4 and 5 respectively.

Figure 3A:
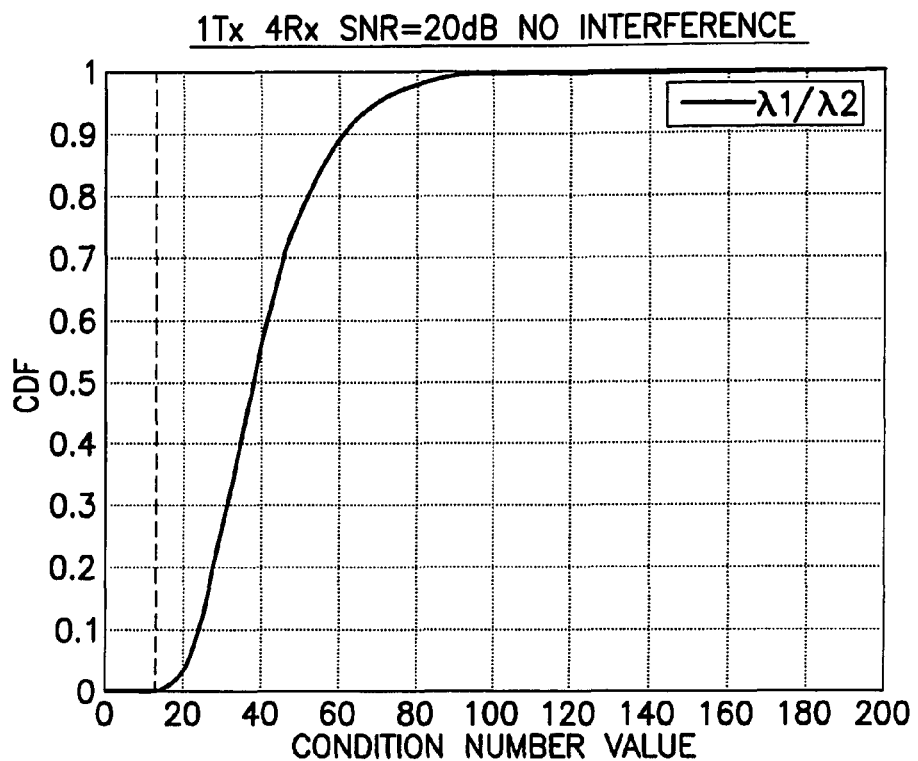
FIG. 3A depicts a plot of CDF vs. condition numbers with no interference based on a ITU Pedestrian B channel model.
Figure 3B:
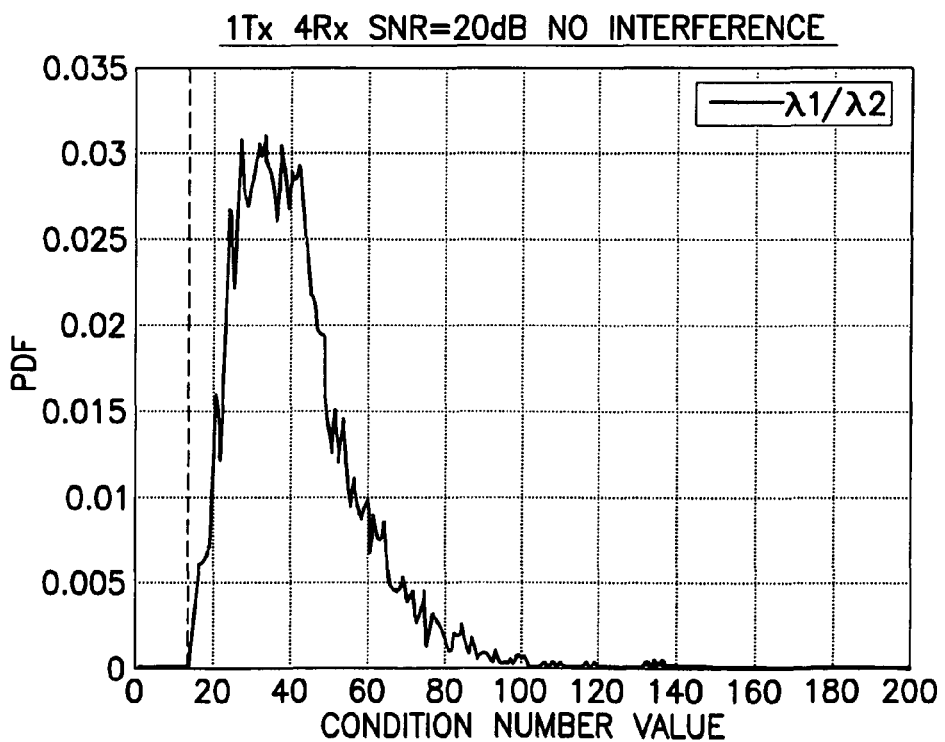
FIG. 3B depicts a plot of PDF vs. condition numbers with no interference, based on a ITU Pedestrian B channel model.

In FIGS. 3A and 3B, the 'no interference' case, almost all the condition numbers $\gamma_1=\lambda_1/\lambda_2$ are greater than seventeen (17), which indicates that the noise subspace has three singular values.

Figure 4A:
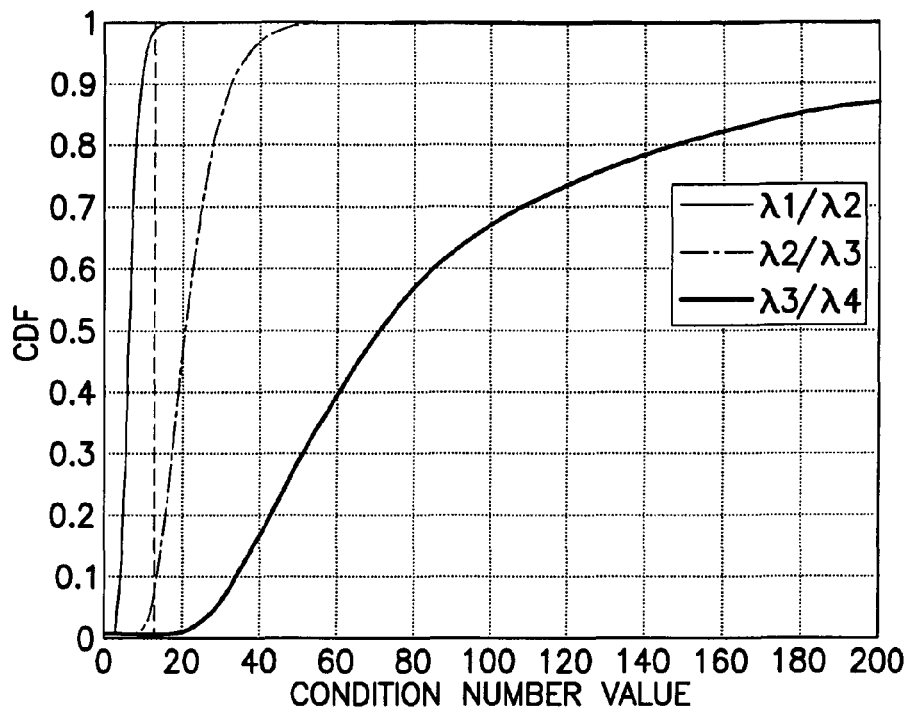
FIG. 4A depicts a plot of CDF vs. condition numbers with one interfering stream, based on a ITU Pedestrian B channel model.
Figure 4B:
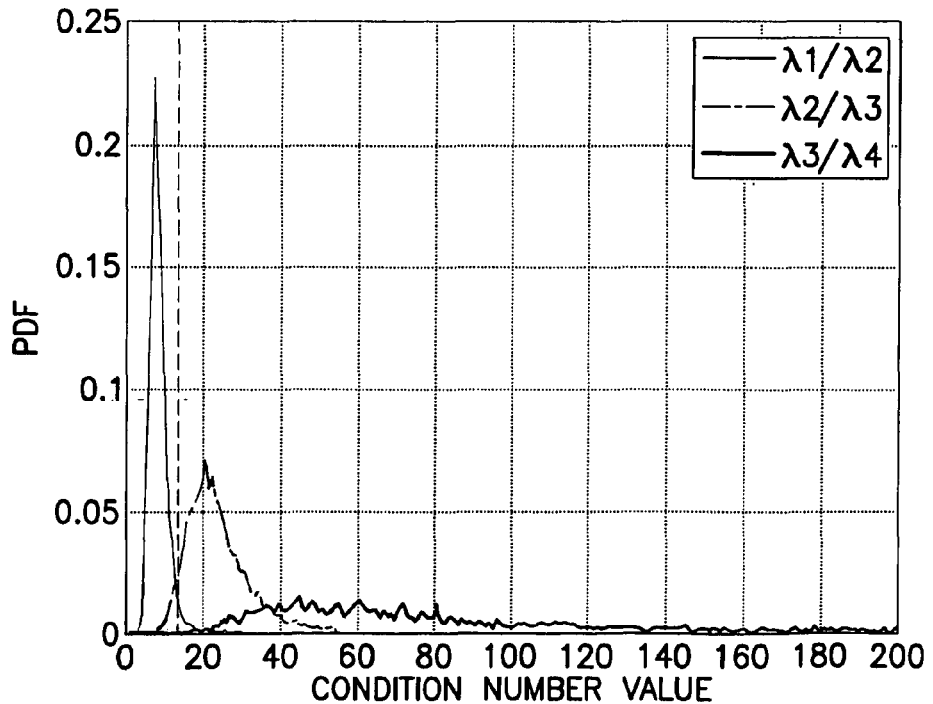
FIG. 4B depicts a plot of PDF vs. condition numbers with one interfering stream, based on a ITU Pedestrian B channel model.

In FIGS. 4A and 4B, where there is one interfering stream, more than 90% of $\gamma_1$ values are less than seventeen (17), while more than 90% of $\gamma_2=\lambda_2/\lambda_3$ values are greater than seventeen (17). This indicates that the noise subspace contains two singular values.

Figure 5A:
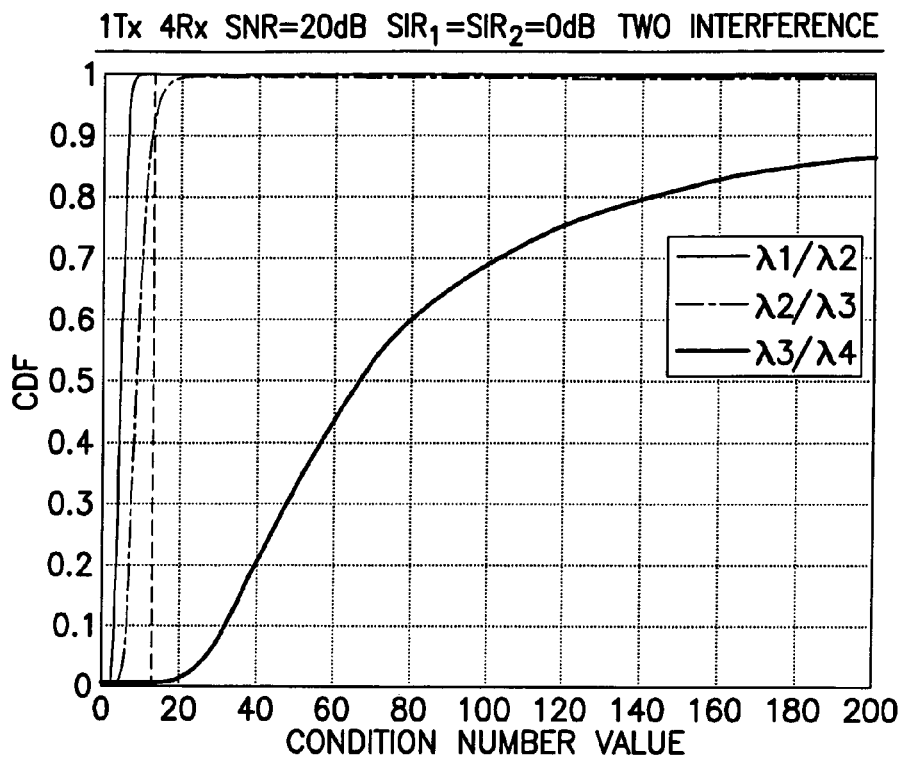
FIG. 5A depicts a plot of CDF vs. condition numbers with two interfering streams, based on a ITU Pedestrian B channel model.
Figure 5B:
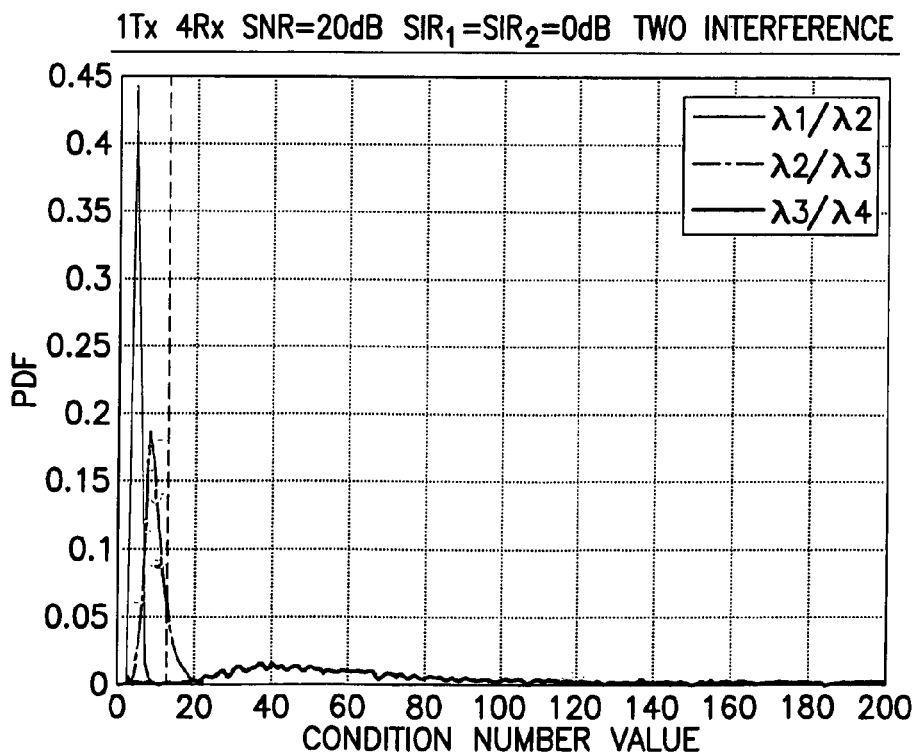
FIG. 5B depicts a plot of PDF vs. condition numbers with two interfering streams, based on a ITU Pedestrian B channel model.

In FIGS. 5A and 5B, the two interference case, all $\gamma_1$ values and more than 90% of the $\gamma_2$ values are less than seventeen (17). Furthermore almost all the values of $\gamma_3=\lambda_3/\lambda_4$ are greater than seventeen (17). These figures demonstrate that the noise subspace has only one singular value. As a result, for the channel model ITU Pedestrian B, when SNR is around 20 dB and the SIR is around 20 dB the condition number threshold to separate noise subspace from signal and interference is seventeen (17).

For a practical channel realization of the model ITU Pedestrian B, using the above system parameters, the calculated condition number values are $\gamma_1$=3, $\gamma_2$=8 and $\gamma_3$=28, it is possible to say that there are two interfering streams.

Figure 6:
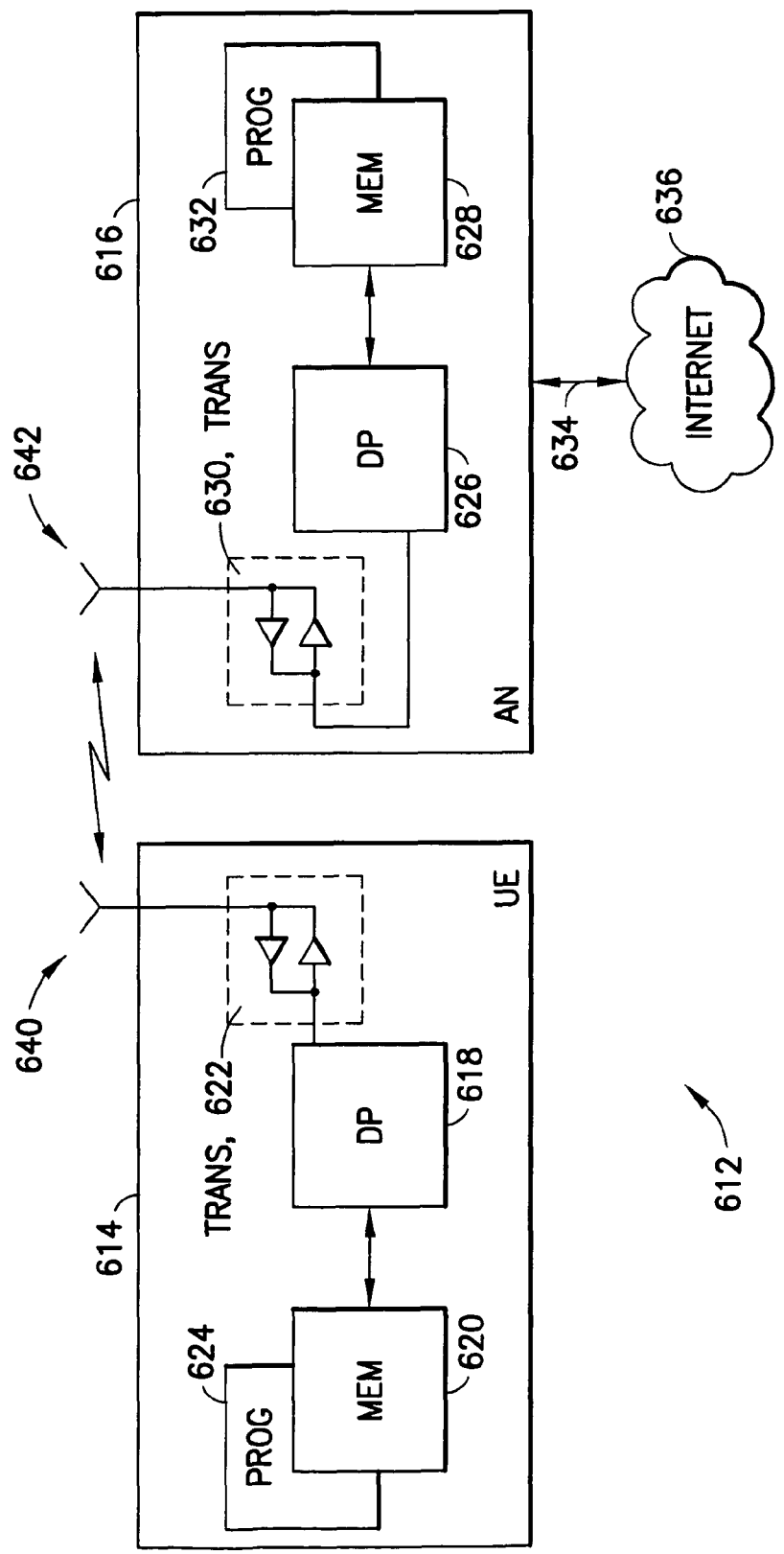
FIG. 6. illustrates a simplified block diagram of various electronic devices that are suitable for use in practicing the exemplary embodiments of this invention.

Reference is made to FIG. 6 for illustrating a simplified block diagram of various electronic devices that are suitable for use in practicing the exemplary embodiments of this invention. In FIG. 6, a wireless network 612 is adapted for communication with a user equipment (UE) 614 via an access node (AN) 616. The UE 614 includes a data processor (DP) 618, a memory (MEM) 620 coupled to the DP 618, and a suitable RF transceiver (TRANS) 622 (having a transmitter (TX) and a receiver (RX)) coupled to the DP 618. The MEM 620 stores a program (PROG) 624. The TRANS 622 is for bidirectional wireless communications with the AN 616. Note that the TRANS 622 has at least one antenna 640 to facilitate communication.

The AN 616 includes a data processor (DP) 626, a memory (MEM) 628 coupled to the DP 626, and a suitable RF transceiver (TRANS) 630 (having a transmitter (TX) and a receiver (RX)) coupled to the DP 626. The MEM 628 stores a program (PROG) 632. The TRANS 630 is for bidirectional wireless communications with the UE 614. Note that the TRANS 630 has at least one antenna 642 to facilitate communication. The AN 616 is coupled via a data path 634 to one or more external networks or systems, such as the internet 636, for example.

At least one of the PROGs 624, 632 is assumed to include program instructions that, when executed by the associated DP, enable the electronic device to operate in accordance with the exemplary embodiments of this invention, as discussed herein. In general, the various exemplary embodiments of the UE 614 can include, but are not limited to, mobile nodes, mobile stations, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the DPs 618, 626 of the UE 614 and the AN 616, or by hardware, or by a combination of software and hardware.

The MEMs 620, 628 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 618, 626 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 620, 628), these components may generally be seen to correspond to storage devices, storage components and/or storage blocks. In some exemplary embodiments, these components may comprise one or more computer-readable mediums and/or one or more program storage devices.

While described above in reference to data processors (DPs 618, 626), these components may generally be seen to correspond to processors, processing devices, processing components, processing blocks, one or more processing units, circuits, circuit devices, circuit components, circuit blocks, integrated circuits and/or chips (e.g., chips comprising one or more circuits or integrated circuits).

The antennas 640, 642 may be of any type suitable to the local technical environment and may be implemented using any suitable antenna technology (e.g., antenna arrays, MIMO systems).

It should be appreciated that the exemplary embodiments of this invention are not limited for use with only one particular type of wireless communication system, and that they may be used to advantage in other wireless communication systems.

Figure 7:
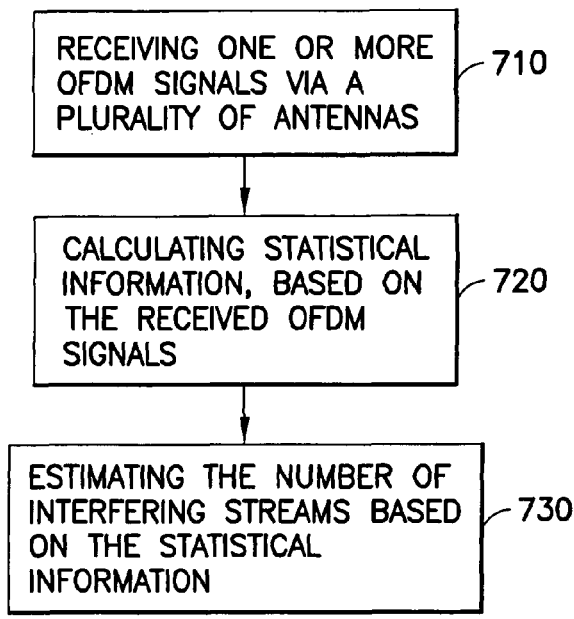
FIG. 7. shows a flow diagram of a method in accordance with an exemplary embodiment of this invention.

FIG. 7 shows a flow diagram of a method in accordance with an exemplary embodiment of this invention. In 710, one or more OFDM signals are received via a plurality of antennas. Statistical information is calculated from these received OFDM signals in 720. In 730, the number of interfering streams is estimated from the statistical information.

Additionally, the method may include steps of storing the OFDM signals in a square matrix and determining the covariance matrix of the square matrix. The received OFDM signals can be used to calculate a CDF. A PDF can be calculated from the received OFDM signals.

Furthermore, the estimation of the number of interfering streams may also be based upon the use of a threshold value.

Additionally, the parameters of a receiver may be adjusted based in part on the number of interfering streams. This may include activating additional antennas and changing the receive algorithm.

Figure 8:
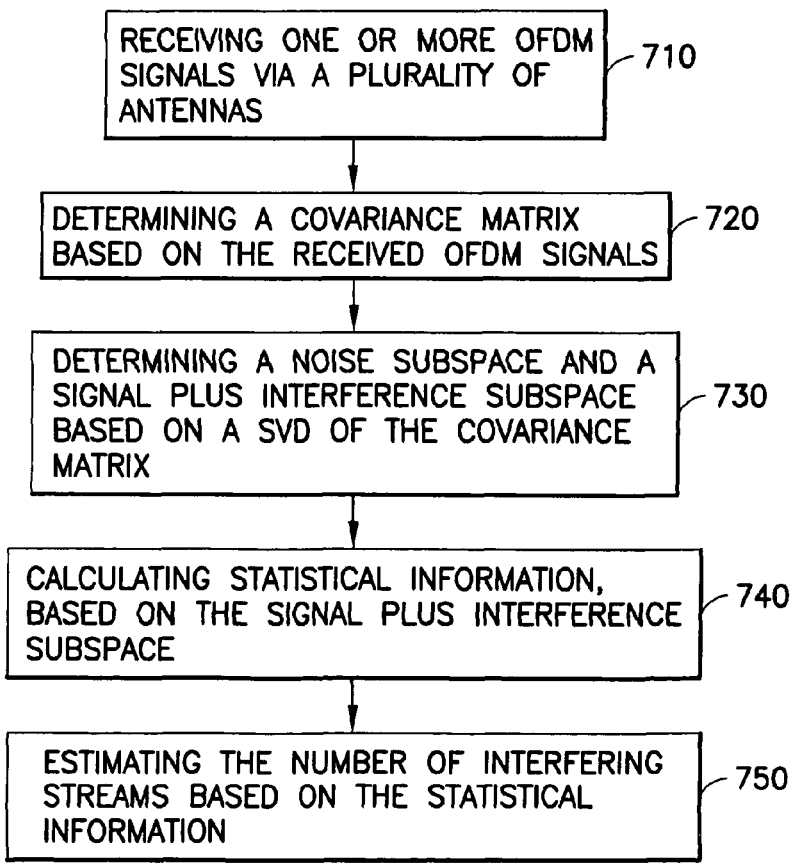
FIG. 8. shows a flow diagram of a method in accordance with an exemplary embodiment of this invention.

FIG. 8 shows a flow diagram of a method in accordance with an exemplary embodiment of this invention. In 810, one or more OFDM signals are received via a plurality of antennas. A noise subspace and a signal plus interference subspace are determined based on a SVD of the covariance matrix in 820. In 830, statistical information is calculated based on the signal plus interference subspace. Statistical information is calculated from these received OFDM signals in 840. In 850, the number of interfering streams is estimated from the statistical information.

The blocks depicted in FIGS. 7 and 8 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 7 and 8 should be considered merely exemplary and non-limiting. It should be appreciated that the blocks depicted in FIGS. 7 and 8 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 7 and 8 so as to implement one or more further exemplary embodiments of the invention, such as those described in further detail herein.

That is, the non-limiting, exemplary embodiments of the invention shown in FIGS. 7 and 8 may be implemented, practiced or utilized in conjunction with one or more further aspects in any combination (e.g., any combination that is suitable, practicable and/or feasible) and are not limited only to the blocks, steps, functions and/or operations illustrated in FIGS. 7 and 8.

A method in accordance with the non-limiting, exemplary embodiment of the invention shown in FIGS. 7 and 8 may be performed by any node in the system, for example, a base station, an access node, a user device or a relay station.

An exemplary embodiment of this invention is a method for determining the number of interfering streams. One or more OFDM signals are received via a plurality of antennas. Statistical information is calculated from these received OFDM signals. The number of interfering streams is estimated from the statistical information.

In further embodiments, the method may include steps of storing the OFDM signals in a square matrix and determining the covariance matrix of the square matrix. The received OFDM signals can be used to calculate a CDF and/or a PDF. The estimation of the number of interfering streams may also be based upon the use of a threshold value. Additionally, the parameters of a receiver may be adjusted based in part on the number of interfering streams. This may include activating additional antennas and changing the receive algorithm.

A further exemplary embodiment of this invention is a storage medium storing a computer program of instructions, the execution of which determine the number of interfering streams. The computer program instructions include receiving one or more OFDM signals in a plurality of antennas. Statistical information is calculated from these received OFDM signals. The number of interfering streams is estimated from the statistical information.

In further embodiments, the computer program may include instructions for storing the OFDM signals in a square matrix and determining the covariance matrix of the square matrix. The received OFDM signals can be used to calculate a CDF and/or a PDF. The estimation of the number of interfering streams may also be based upon the use of a threshold value. Additionally, the parameters of a receiver may be adjusted based in part on the number of interfering streams. This may include activating additional antennas and changing the receive algorithm.

An additional exemplary embodiment of this invention is an apparatus for determining the number of interfering streams. The apparatus includes a plurality of antennas for receiving one or more OFDM signals. Statistical information from these received OFDM signals is calculated in one or more processors. The number of interfering streams is estimated from the statistical information.

In further embodiments, the apparatus may include modules for storing the OFDM signals in a square matrix and determining the covariance matrix of the square matrix. The received OFDM signals can be used to calculate a CDF and/or a PDF. The estimation of the number of interfering streams may also be based upon the use of a threshold value. Additionally, the parameters of the receiver may be adjusted based in part on the number of interfering streams. This may include activating additional antennas and changing the receive algorithm.

A further exemplary embodiment of this invention is a signal storing a instructions, the execution of which determine the number of interfering streams. The instructions include receiving one or more OFDM signals in a plurality of antennas. Statistical information is calculated from these received OFDM signals. The number of interfering streams is estimated from the statistical information.

In further embodiments, the signal may include instructions for storing the OFDM signals in a square matrix and determining the covariance matrix of the square matrix. The received OFDM signals can be used to calculate a CDF and/or a PDF. The estimation of the number of interfering streams may also be based upon the use of a threshold value. Additionally, the parameters of a receiver may be adjusted based in part on the number of interfering streams. This may include activating additional antennas and changing the receive algorithm.

In an additional embodiment of the signal as in any above, wherein the signal is stored on a storage medium (e.g., a computer-readable medium, a memory, a storage component, a storage device, an apparatus).

An exemplary embodiment in accordance with this invention is a method for determining the number of interfering streams. The method includes calculating statistical information based on one or more received OFDM signals. The number of interfering streams is estimated from the statistical information in this method. The one or more OFDM signals are received via a plurality of antennas (e.g., two or more individual antennas, an antenna array).

In a further embodiment of the method above, the method includes storing the one or more received OFDM signals in a square matrix. A covariance matrix of the square matrix is determined. The statistical information is based on the covariance matrix.

In an additional embodiment of the method above, the method includes determining a noise subspace and a signal plus interference subspace based on a SVD of the covariance matrix. The statistical information is based on the signal plus interference subspace.

In a further embodiment of any one of the methods above, the method includes calculating a CDF and/or a PDF based on the one or more received OFDM signals.

In an additional embodiment of any one of the methods above, the number of interfering streams is estimated based on a threshold value.

In a further embodiment of any one of the methods above, the method includes adjusting operating parameters of a receiver based on the estimated number of interfering streams.

In an additional embodiment of the method above, adjusting operating parameters includes activating one or more additional antenna and/or changing a receive algorithm.

In a further embodiment of any one of the methods above, the method includes transmitting an indication of the estimated number of interfering streams.

An additional exemplary embodiment in accordance with this invention is an apparatus for determining the number of interfering streams. The apparatus includes a processor. The processor is configured to calculate statistical information based on one or more received OFDM signals; and to estimate a number of interfering streams from the statistical information. The one or more OFDM signals are received via a plurality of antennas.

In a further embodiment of the apparatus above, the apparatus includes a memory configured to store the one or more received OFDM signals in a square matrix. The processor is also configured to determine a covariance matrix of the square matrix. The statistical information is based on the covariance matrix.

In an additional embodiment of the apparatus above, the processor is also configured to determine a noise subspace and a signal plus interference subspace based on a SVD of the covariance matrix. The statistical information is based on the signal plus interference subspace.

In a further embodiment of any one of the apparatus above, the processor is also configured to calculate a CDF and/or a PDF based on the one or more received OFDM signals.

In an additional embodiment of any one of the apparatus above, the processor is also configured to adjust operating parameters of a receiver based on the estimated number of interfering streams.

In a further embodiment of any one of the apparatus above, the apparatus also includes a transmitter configured to transmit an indication of the estimated number of interfering streams.

In an additional embodiment of any one of the apparatus above, the apparatus also includes a receiver configure to receive the one or more OFDM signal via the plurality of antennas.

A further exemplary embodiment in accordance with this invention is a computer program for determining the number of interfering streams. A computer-readable medium may be tangibly encoded with the computer program. The computer program includes program instructions, execution of the program instructions results in operations including calculating statistical information based on one or more received OFDM signals; and estimating a number of interfering streams from the statistical information. The one or more OFDM signals are received via a plurality of antennas.

In an additional embodiment of the computer program above, the operations also include storing the one or more received OFDM signals in a square matrix; and determining a covariance matrix of the square matrix. The statistical information is based on the covariance matrix.

In a further embodiment of the computer program above, the operations also include determining a noise subspace and a signal plus interference subspace based on a SVD of the covariance matrix. The statistical information is based on the signal plus interference subspace.

In an additional embodiment of any one of the computer program above, the operations also include calculating a CDF and/or a PDF based on the one or more received OFDM signals.

In a further embodiment of any one of the computer program above, the operations also include adjusting operating parameters of a receiver based on the estimated number of interfering streams.

An additional exemplary embodiment in accordance with this invention is a computer program for determining the number of interfering streams. A computer-readable medium may be tangibly encoded with the computer program. The computer program includes program instructions, execution of the program instructions results in operations including calculating statistical information based on one or more received OFDM signals; and estimating a number of interfering streams from the statistical information. The one or more OFDM signals are received via a plurality of antennas.

A further exemplary embodiment in accordance with this invention is a signal encoded with/embodying a computer program for determining the number of interfering streams. The computer program includes program instructions, execution of the program instructions results in operations including calculating statistical information based on one or more received OFDM signals; and estimating a number of interfering streams from the statistical information. The one or more OFDM signals are received via a plurality of antennas.

In an additional embodiment of the signal above, the operations also include storing the one or more received OFDM signals in a square matrix; and determining a covariance matrix of the square matrix. The statistical information is based on the covariance matrix.

In a further embodiment of the signal above, the operations also include determining a noise subspace and a signal plus interference subspace based on a SVD of the covariance matrix. The statistical information is based on the signal plus interference subspace.

In an additional embodiment of any one of the signal above, the operations also include calculating a CDF and/or a PDF based on the one or more received OFDM signals.

In a further embodiment of any one of the signal above, the operations also include adjusting operating parameters of a receiver based on the estimated number of interfering streams.

In an additional embodiment of the signal as in any above, wherein the signal is stored on a storage medium (e.g., a computer-readable medium, a memory, a storage component, a storage device, an apparatus).

An additional exemplary embodiment in accordance with this invention is an apparatus for determining the number of interfering streams. The apparatus includes means for calculating statistical information based on one or more received OFDM signals. Means for estimating a number of interfering streams from the statistical information are also included. The one or more OFDM signals are received via a plurality of antennas.

In a further embodiment of the apparatus above, the apparatus includes means for storing the one or more received OFDM signals in a square matrix; and means for determining a covariance matrix of the square matrix. The statistical information is based on the covariance matrix.

In an additional embodiment of the apparatus above, the apparatus includes means for determining a noise subspace and a signal plus interference subspace based on a SVD of the covariance matrix. The statistical information is based on the signal plus interference subspace.

In a further embodiment of any one of the apparatus above, the apparatus includes means for calculating a CDF and/or a PDF based on the one or more received OFDM signals.

In an additional embodiment of any one of the apparatus above, the apparatus includes means for adjusting operating parameters of a receiver based on the estimated number of interfering streams.

In a further embodiment of any one of the apparatus above, the apparatus includes means for receiving the one or more OFDM signal via the plurality of antennas.

In an additional embodiment of any one of the apparatus above, the apparatus includes means for transmitting an indication of the estimated number of interfering streams.

In a further embodiment of any one of the apparatus above, the calculating means is a processor and the estimating means is a processor.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Still further, the various labels used (e.g., base station) are not intended to be limiting in any respect, as these labels may be identified by any suitable names (e.g., eNode B).

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    storing at least one received orthogonal frequency division multiplexing signal in a square matrix;
    determining a covariance matrix of the square matrix;
    calculating statistical information based on the covariance matrix; and
    estimating a number of interfering streams from the statistical information,
    where the at least one orthogonal frequency division multiplexing signal is received via a plurality of antennas.

2. The method as in claim 1, further comprising determining a noise subspace and a signal plus interference subspace based on a singular value decomposition of the covariance matrix,
    where the statistical information is based on the signal plus interference subspace.

3. The method as in claim 1, further comprising calculating at least one of a cumulative density function and a probability density function based on the at least one received orthogonal frequency division multiplexing signal.

4. The method as in claim 1, where estimating the number of interfering streams is further based on a threshold value.

5. The method as in claim 1, further comprising adjusting operating parameters of a receiver based on the estimated number of interfering streams.

6. The method as in claim 5, where adjusting operating parameters comprises at least one of activating at least one additional antenna and changing a receive algorithm.

7. An apparatus comprising at least one processor; and at least one memory including computer program code, the at least one memory and the computer program code configured to, with the at least one processor, cause the apparatus to perform at least the following:
    to store at least one received orthogonal frequency division multiplexing signal in a square matrix,
    to determine a covariance matrix of the square matrix;
    to calculate statistical information based on the covariance matrix; and
    to estimate a number of interfering streams from the statistical information,
    where the at least one orthogonal frequency division multiplexing signal is received via a plurality of antennas.

8. The apparatus as in claim 7, where the at least one memory and the computer program code are further configured to cause the apparatus to determine a noise subspace and a signal plus interference subspace based on a singular value decomposition of the covariance matrix,
    where the statistical information is based on the signal plus interference subspace.

9. The apparatus as in claim 7, the at least one memory and the computer program code are further configured to cause the apparatus to calculate at least one of a cumulative density function and a probability density function based on the at least one received orthogonal frequency division multiplexing signal.

10. The apparatus as in claim 7, the at least one memory and the computer program code are further configured to cause the apparatus to adjust operating parameters of a receiver based on the estimated number of interfering streams.

11. The apparatus as in claim 7, the at least one memory and the computer program code are further configured to cause the apparatus to receive the at least one orthogonal frequency division multiplexing signal via the plurality of antennas.

12. A computer-readable medium tangibly encoding a computer program comprising program instructions, execution of the program instructions resulting in operations comprising:
    storing at least one received orthogonal frequency division multiplexing signal in a square matrix;
    determining a covariance matrix of the square matrix;
    calculating statistical information based on the covariance matrix; and
    estimating a number of interfering streams from the statistical information,
    where the at least one orthogonal frequency division multiplexing signal is received via a plurality of antennas.

13. The computer-readable medium as in claim 12, where the operations further comprise determining a noise subspace and a signal plus interference subspace based on a singular value decomposition of the covariance matrix,
    where the statistical information is based on the signal plus interference subspace.

14. The computer-readable medium as in claim 12, where the operations further comprise calculating at least one of a cumulative density function and a probability density function based on the at least one received orthogonal frequency division multiplexing signal.

15. The computer-readable medium as in claim 12, where the operations further comprise adjusting operating parameters of a receiver based on the estimated number of interfering streams.

16. An apparatus comprising:
    means for storing at least one received orthogonal frequency division multiplexing signal in a square matrix;
    means for determining a covariance matrix of the square matrix;
    means for calculating statistical information based on the covariance matrix; and
    means for estimating a number of interfering streams from the statistical information,
    where the at least one orthogonal frequency division multiplexing signal is received via a plurality of antennas.

17. The apparatus as in claim 16, where the calculating means is a processor and the estimating means is a processor.

* * * * *